United States Patent
Sheng et al.

(10) Patent No.: US 6,491,414 B2
(45) Date of Patent: Dec. 10, 2002

(54) TRANSPARENT FILM SCANNER HAVING LIGHT SOURCE SYSTEM WITH DIFFUSER AND REFLECTOR

(76) Inventors: Thomas Sheng, No. 20, Creation 1st Road, Science-Based Industrial Park, Hsin-Chu (TW); Jih-Yam Chen, 29, Lane 1, Alley 607, Sec. 1, Kuang-Fu Road, Hsin-Chu (TW)

(*) Notice: Subject to any disclaimer, the term of this patent is extended or adjusted under 35 U.S.C. 154(b) by 25 days.

(21) Appl. No.: 09/799,286

(22) Filed: Mar. 5, 2001

(65) Prior Publication Data

US 2001/0009512 A1 Jul. 26, 2001

Related U.S. Application Data

(63) Continuation-in-part of application No. 09/303,453, filed on May 3, 1999.

(51) Int. Cl.$^7$ .................................................. F21V 7/00
(52) U.S. Cl. .................. 362/307; 362/311; 362/328; 362/33; 362/355
(58) Field of Search .......................... 362/307, 33, 311, 362/328, 355, 223

(56) References Cited

U.S. PATENT DOCUMENTS

| | | | | |
|---|---|---|---|---|
| 4,292,663 A | * | 9/1981 | Martino et al. | 362/97 |
| 4,415,958 A | * | 11/1983 | Guerra | 362/301 |
| 5,791,771 A | * | 8/1998 | Bjorner et al. | 362/297 |
| 5,884,995 A | * | 3/1999 | Perlo et al. | 362/327 |

\* cited by examiner

*Primary Examiner*—Sandra O'Shea
*Assistant Examiner*—Ronald E. DelGizzi
(74) *Attorney, Agent, or Firm*—Charles E. Baxley

(57) ABSTRACT

A transparent film scanner having a light source with a diffuser and a reflector includes a light source for generating a primary light that is diffused by a diffuser to obtain a more uniform secondary light. The secondary light source is then reflected by a reflector to produce a tertiary light for illuminating the film. With a diffused secondary light, the distance between the reflector and the film can be reduced, thus reducing the size of the scanner.

1 Claim, 2 Drawing Sheets

TRANSPARENT FILM SCANNER HAVING LIGHT SOURCE SYSTEM WITH DIFFUSER AND REFLECTOR

CROSS-REFERENCES TO RELATED APPLICATION

The present invention is a continuation-in-part application of the co-pending U.S. Ser. No. 09/303,453, filed on May 3, 1999.

BACKGROUND OF THE INVENTION

1. Field of the Invention

The present invention relates to a transparent film scanner having a light source system with a diffuser and a reflector for scanning transparent films.

2. Description of the Related Art

The closest prior art of which the applicant is aware is disclosed in U.S. Pat. No. 3,850,523 to Skavnak, filed on Jul. 13, 1973, entitled by "PHOTOCOPIER LIGHT BOX".

In scanning a transparent film or a transparency in a scanner, the transparent film is placed over a glass window. The light source is located over the film to be scanned. The transmitted light through the film is sensed by an optical sensing system placed underneath the window.

A traditional optical system for scanning a film is shown in FIG. 1. A film P1 is placed over a glass window G1. The lighting L1 for scanning the film P1 is a secondary light originated from a light source 10 and reflected by a reflecting plate 12. The optical sensor for sensing the light transmitted through the film P1 is located underneath the glass window G1 (not shown). The purpose for using a secondary light to scan the film is to obtain uniform light intensity.

The drawback of such a design is that the distance A1 between the reflecting plate 12 and the film P1 must be placed far away from the reflecting plate to obtain uniformity in light intensity. Such a structure increases the size of the scanner and is undesirable.

SUMMARY OF THE INVENTION

An object of this invention is to provide uniform illumination of a transparent film for a scanner.

Another object of this invention is to reduce the size of a scanner.

These objects are achieved by inserting a light diffuser in front of the light source. The diffused light is then reflected by a reflecting plate to illuminate the film placed on top of a glass scan window. When the light is thus diffused, the distance between the reflecting plate and the film can be made shorter than that in a traditional film scanner.

Further benefits and advantages of the present invention will become apparent after a careful reading of the detailed description with appropriate reference to the accompanying drawings.

DETAILED DESCRIPTION OF THE INVENTION

Figure 1:
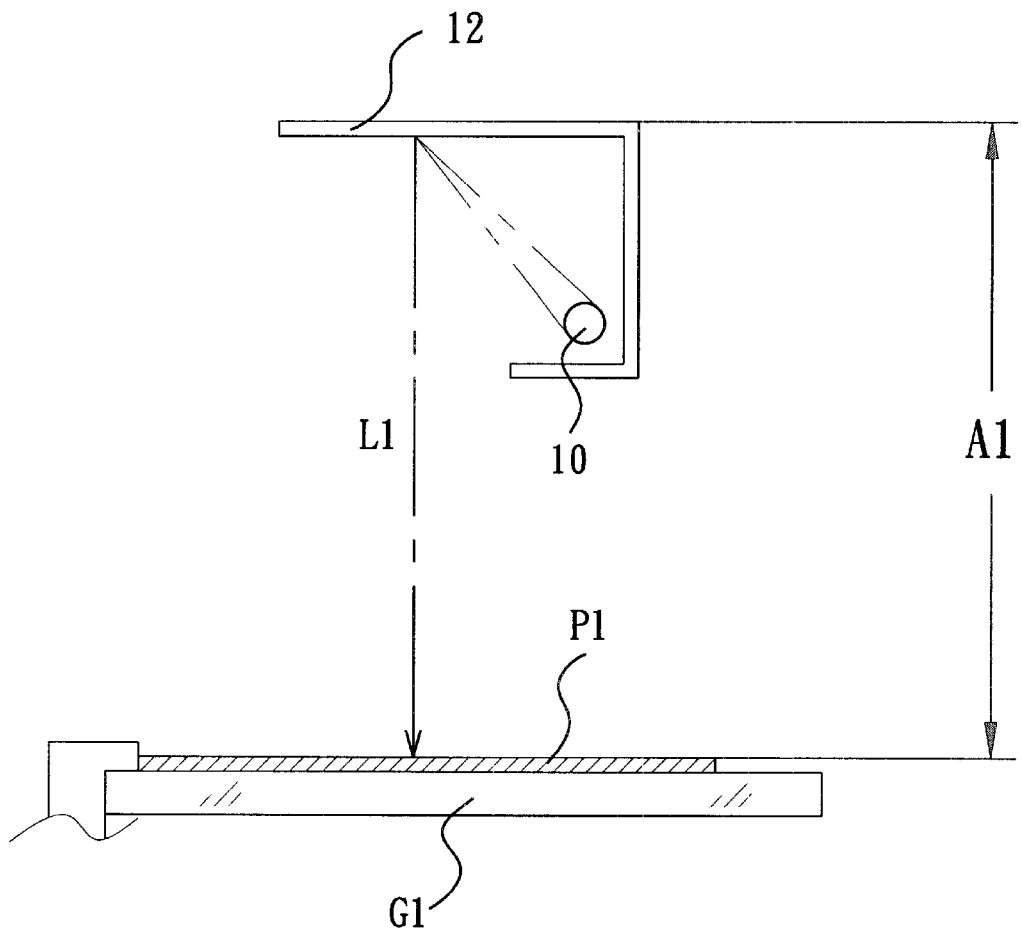
FIG. 1 shows the lighting system of a prior art film scanner.
Figure 2:
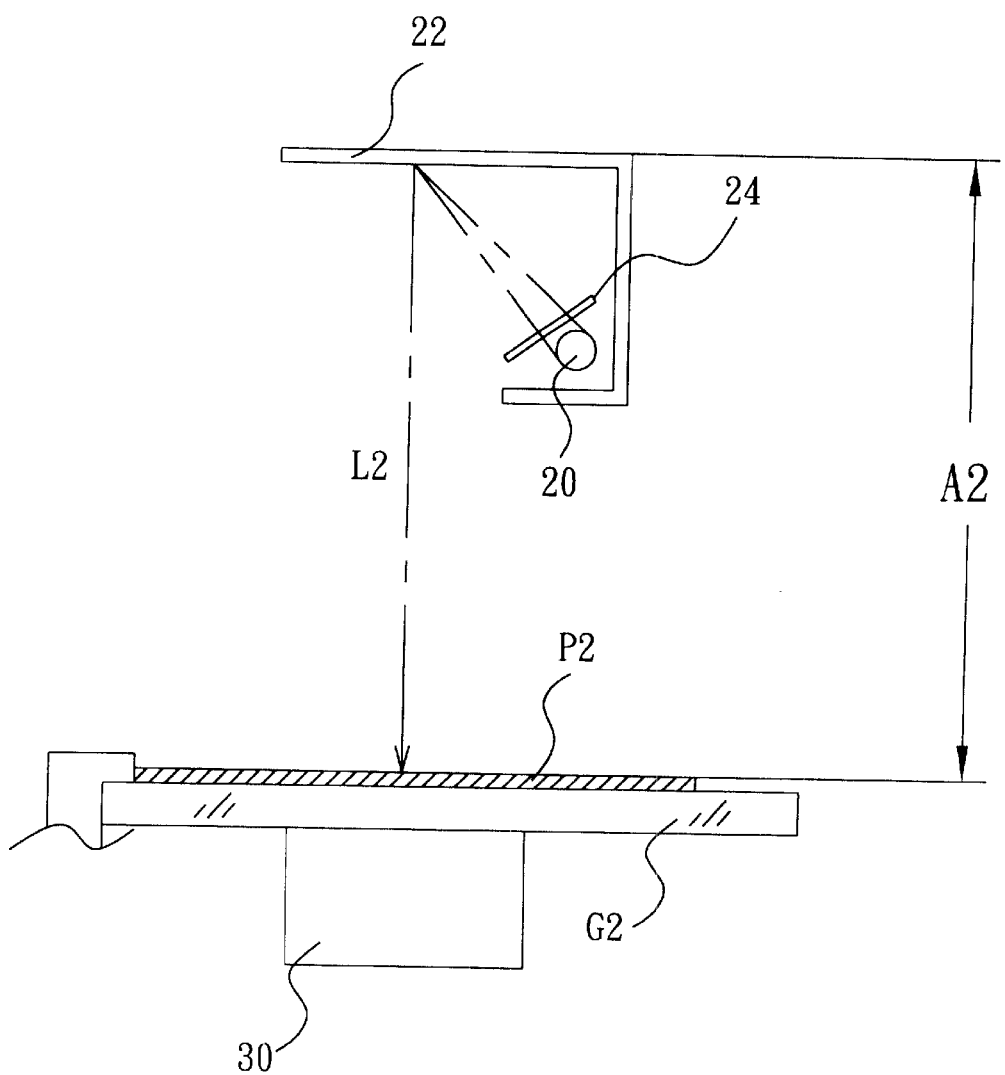
FIG. 2 shows a transparent film scanner having a light source with a diffuser and a reflector in accordance with the present invention.

The transparent film scanner having a light source with a diffuser and a reflector in accordance with the present invention is shown in FIG. 2. The primary light source 20 is placed behind a diffuser 24. The diffuser 24 can produce a uniform secondary light source reaching a reflecting plate 22. The reflected light from the reflecting plate 22 constitutes a tertiary light source L2 which illuminates the film P2 placed on a glass window G2. An optical sensing system 30 is placed underneath the glass window so as to detect and sense the tertiary light L2 which illuminates the film P2 on the glass window G2. Since the diffuser 24 produces a more uniform secondary light than that without a diffuser as in a conventional design, the tertiary light source L2 reflected by the reflecting plate 22 is also more uniform than the light source L1 shown in FIG. 1 of the prior art. With a more uniform tertiary light source L2, the distance A2 between the reflecting plate 22 and the film P2 can be reduced to an amount shorter than A1 used in the prior art shown in FIG. 1.

In a conventional design, the distance A1 in FIG. 1 is typically 44 mm to obtain uniformity. In the present invention shown in FIG. 2, the distance A2 is reduced to 29 mm. Obviously, the scanner of the present invention achieves a lighter and thinner scanner.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A transparent film scanner having a light source system with a diffuser and a reflector for scanning a transparent film placed over a glass window of said transparent film scanner, comprising:

a light source placed above said glass window for generating a primary light for scanning said transparent film placed over said glass window of said transparent film scanner;

a diffuser placed above said light source for distributing said primary light evenly to produce a diffused light source before illuminating said transparent film;

a reflector placed above said diff-user to reflect said diffused light source of said primary light so as to produce a tertiary light source for illuminating said transparent film; and an optical sensing system placed underneath the glass window for sensing the tertiary light source passing through the film.

\* \* \* \* \*